(12) United States Patent
Yamada et al.

(10) Patent No.: US 6,474,616 B2
(45) Date of Patent: Nov. 5, 2002

(54) ARTICLE HOLDING DEVICE

(75) Inventors: Atsushi Yamada, Toyonaka (JP); Hikoe Mizukoshi, Toyonaka (JP); Taku Tashima, Toyonaka (JP); Nobuyasu Furugori, Aichi-ken (JP); Kosaku Taguchi, Toyota (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/907,687

(22) Filed: Jul. 19, 2001

(65) Prior Publication Data

US 2002/0050551 A1 May 2, 2002

(30) Foreign Application Priority Data

Jul. 19, 2000 (JP) ......................................... 2000-218511

(51) Int. Cl.⁷ ............................................... A47B 97/00
(52) U.S. Cl. ..................................... 248/503.1; 296/43
(58) Field of Search ................................ 248/500, 503, 248/503.1, 231.9, 224.8, 225.21; 24/662, 573.1, 297; 410/116, 101, 106, 108, 110; 411/182, 508, 509, 913; 296/43, 63; 297/378.13

(56) References Cited

U.S. PATENT DOCUMENTS 5,533,237 A   7/1996   Higgins ........................ 24/289
5,649,783 A * 7/1997   Ichikawa et al. .......... 24/662 X
6,145,173 A * 11/2000  Suzuki et al. ................. 24/662

FOREIGN PATENT DOCUMENTS

GB     2 201 723      9/1988
JP     8-210335       8/1996

* cited by examiner

*Primary Examiner*—Ramon O. Ramirez
(74) *Attorney, Agent, or Firm*—Kanesaka & Takeuchi (57) ABSTRACT

An article holding device is formed of an outer casing to be attached to a mounting hole of a member to be attached and having a first engaging portion at an inner wall surface, and a core including a main body to be inserted into the outer casing and a second engaging portion provided on an outer wall surface of the main body and engaging the first engaging portion in an assembled condition that the main body is inserted to a predetermined position of the outer casing. A protruding portion is formed at a side wall of the main body to engage the hook inserted into the core. The hook is located in the core and is pushed, so that the hook presses a bottom wall of the core, and the core is inserted into the outer casing and assembled therewith. In this assembled condition, outer wall surfaces of the elastic engaging portions abut against a narrow width portion of the outer casing to thereby strongly hold the hook.

10 Claims, 9 Drawing Sheets

ARTICLE HOLDING DEVICE

BACKGROUND OF THE INVENTION AND RELATED ART STATEMENT

The present invention relates to an article holding device, and especially, it relates to an article holding device which holds a hook provided in a rear seat frame of a vehicle with respect to a panel (floor).

Figure 14:
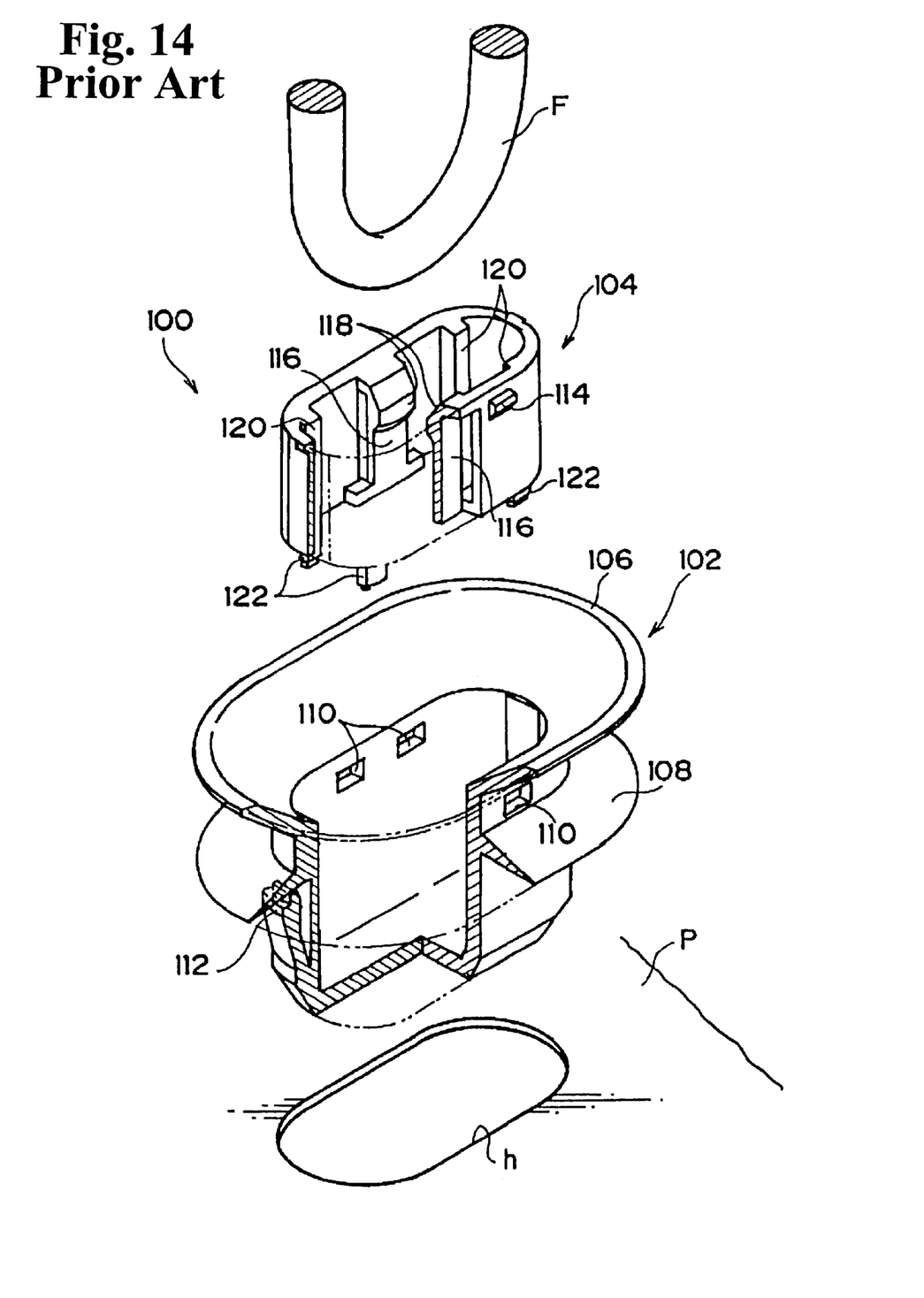
FIG. 14 is a partly cut, exploded perspective view of a conventional article holding device.
Figure 15A:
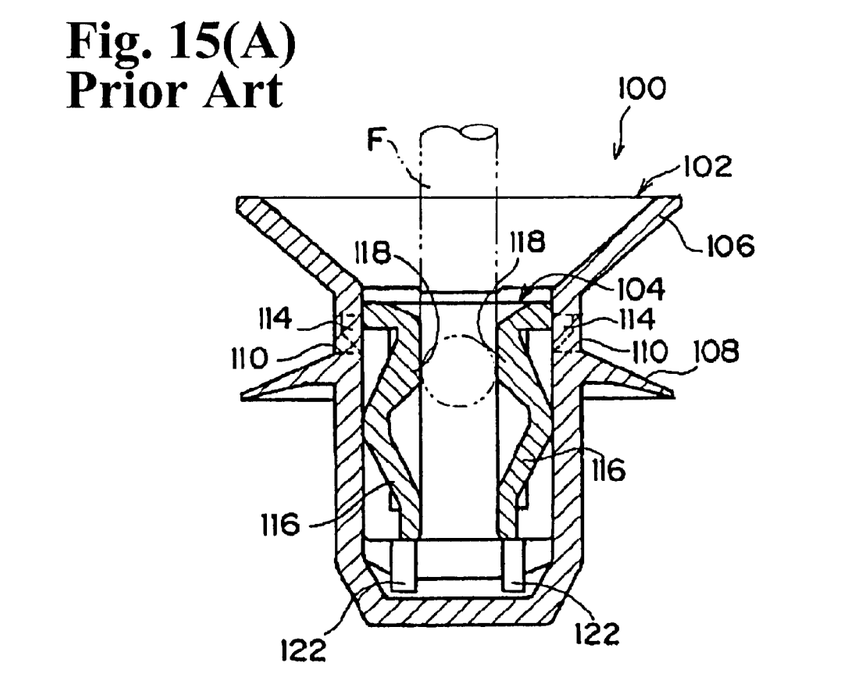
FIGS. 15(A) and 15(B) are side sectional views for explaining an operation of assembling the hook to the conventional article holding device.
Figure 15B:
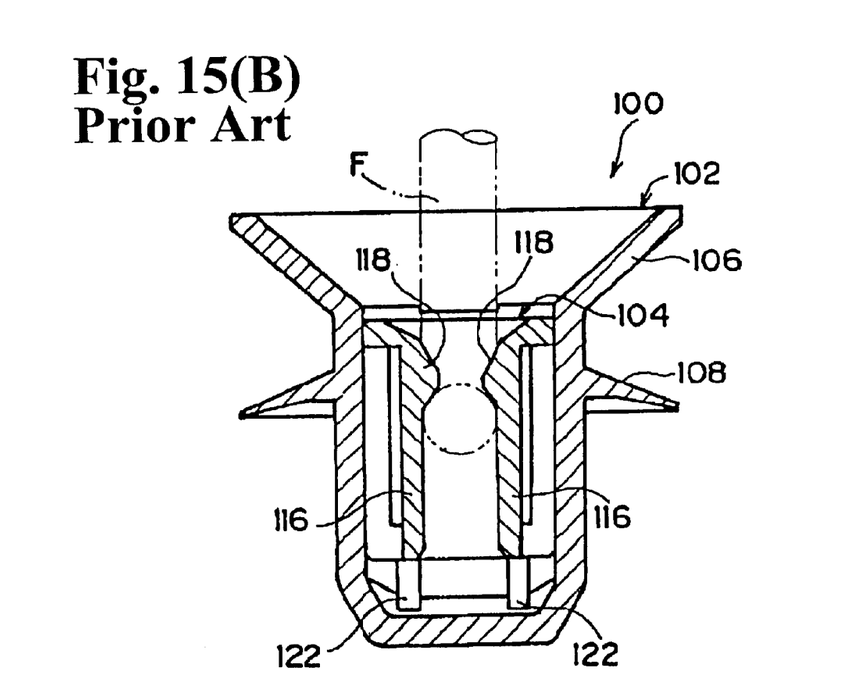

As a conventional article holding device, for example, an article holding device disclosed in Japanese Patent Publication (KOKAI) No. H8-210335 which was proposed by the assignee of the present invention. FIGS. 14 through 15(B) show an article holding device disclosed in Japanese Patent Publication (KOKAI) No. H8-210335, and as shown in the figures, the article holding device is formed of an outer casing 102 and a core 104, which are molded by synthetic resin.

The outer casing 102 has an opened upper surface, and an inside thereof is hollow. In the outer casing 102, a flange 106 expanding upwardly is integrally provided at an upper rim of an outer peripheral surface of a side wall thereof, and an engaging flange 108 expanding downwardly is integrally provided from an intermediate portion of the outer peripheral surface of the side wall of the outer casing 102. Window holes 110 are bored between the flanges 106 and 108, and engaging claws 112 which are elastically deformable are disposed on the outer peripheral surface of the side wall located below the engaging flange 108. When the outer casing 102 is inserted into a mounting hole h in a panel P, the engaging flange 108 covers a front surface at a peripheral rim of the mounting hole h, and at the same time, the panel P is sandwiched between the engaging flange 108 and the engaging claw 112, so that the outer casing 102 is fixed at this condition.

The core 104 inserted into a hollow portion of the outer casing 102 has a substantially cylindrical shape. In the core 104, an upper portion of an outer peripheral surface of a side wall thereof is integrally provided with engaging projections 114 engaging the window holes 110 of the outer casing 102, and an inner peripheral surface of the side wall of the core 104 is integrally provided with a pair of elastic engaging portions 116 facing each other. The elastic engaging portions 116 have the same thickness as that of the side wall, and are projected inwardly such that upper and lower ends thereof are connected to the side wall. At the upper end portions of the elastic engaging portions 116, expanded portions 118 projecting to have a substantially triangle section are disposed to face each other. Also, at the left and right positions on the inner peripheral surface of the side wall with respect to the respective elastic engaging portions 116, positioning portions 120 for positioning an inserted hook F of a rear seat frame are integrally disposed such that the positioning portions 120 respectively face each other, and the positioning portions 120 are continued to legs 122 on a lower surface of the core 104, respectively.

In order to hold the hook F by the article holding device 100, the core 104 is assembled into the outer casing 102 in a direction shown in the figure, and after attaching the article holding device 100 to the panel P, the hook F is pushed into the core 104 to thereby hold the hook F. At this time, the respective expanded portions 118 of the elastic engaging portions 116 are pressed by the hook F such that both elastic engaging portions 116 of the core 104 are outwardly bent and deformed as shown in FIG. 15(A). From this condition, when the hook F is further pushed to pass through a space between the expanded portions 118, both elastic engaging portions 116 are returned to the original condition by the elastic force, and the hook F is engaged with the expanded portions 118 to be held thereat as shown in FIG. 15(B).

In the article holding device as described above, it will be a problem if the hook held by the article holding device is easily released or disengaged. Therefore, a force for extracting the hook (a force for holding the hook) is adequately set in accordance with the purpose. In the article holding device 100 for the seat as described above, in view of the safety, a high extracting force is required, and the desired high extracting force is obtained by increasing the rigidity of the elastic engaging portion 116 such that the elastic engaging portion 116 is difficult to be bent and deformed.

In accordance therewith, however, an inserting force for inserting the hook F into the article holding device 100 (the core 104) is increased, resulting in a problem that a workability at the time of assembling the hook F is deteriorated. Especially, in a mass production step of vehicles in which the operations of the assembling described above are continuously carried out, since burdens to workers or operators become heavy, an improvement in the hook inserting force has been strongly desired.

The present invention has been made in view of the foregoing, and an object of the invention is to provide an article holding device in which a workability in assembling the hook can be improved by decreasing only the inserting force without decreasing a holding force for the hook in engaging the hook disposed in an article.

Further objects and advantages of the invention will be apparent from the following description of the invention.

SUMMARY OF THE INVENTION

To achieve the aforementioned object, a first aspect of the invention provides an article holding device for holding an article to a member to be attached by engaging with a hook provided in the article. The article holding device according to the first aspect of the invention is formed of an outer casing, which is attached to a mounting hole provided in the member to be attached and includes a hollow inside and an inner wall surface provided with a first engaging portion; and a core having a main body, a second engaging portion, and elastic engaging portions. In the core of the article holding device, the main body is inserted into the outer casing and includes a hollow inside for receiving the hook, an inner wall surface, an outer wall surface and a bottom wall capable of abutting against the inserted hook. The second engaging portion is provided on the outer wall surface of the main body, and engaged with the first engaging portion in an assembled condition that the main body is inserted to a predetermined position of the outer casing.

The elastic engaging portions are disposed integrally at side walls of the main body to be elastically deformed, and include protruding portions protruding toward an inner side than the inner wall surface of the main body. The elastic engaging portions are engaged with the hook inserted into the core. The protruding portions have rear surfaces abutting against the inner wall surface of the outer casing in the assembled condition.

According to the first aspect of the invention, the article holding device is formed of the outer casing attached to the mounting hole in the member to be attached and having the hollow inside, and the core, which is inserted into the outer casing to be assembled therewith and includes the hollow inside engaging the hook.

In the core, the elastically deformable elastic engaging portions are integrally provided at the side wall of the main body, and the inserted hook is engaged with the protruding portions of the elastic engaging portions which are protruded toward an inner side than the inner wall surface of the main body. Namely, when the hook is inserted into the core (main body), the protruding portions are pushed by the hook to elastically bend and deform the elastic engaging portions, and when the hook is further pushed therein to pass through the protruding portions, the protruding portions are returned inwardly by the elastic force of the elastic engaging portions to thereby hold the hook.

After the hook is engaged with and caught at the core, the hook is pushed such that the core is inserted into the outer casing. Thus, the hook abuts against the bottom wall of the outer casing, and the core (main body) is inserted into the outer casing. When the core is inserted into the outer casing at the predetermined position, the second engaging portion provided at the main body is engaged with the first engaging portion provided at the outer casing to be assembled therewith. In this assembled condition, the rear surfaces of the protruding portions of the elastic engaging portions contact the inner wall surface of the outer casing, to thereby prevent the movement (elastic deformation) of displacing the protruding portions outwardly. Therefore, even if a large extracting force is applied to the hook, the hook is strongly held since the protruding portions can not be moved or retreated outwardly, so that the hook is not easily disengaged from the article holding device.

As described above, in the condition that the hook in the article is assembled with the article holding device, the elastic engaging portions of the core reinforced by the outer casing securely hold the hook by the protruding portions. In case the hook is inserted into the main body of the core such that the hook is engaged with the protruding portions before the core is finally assembled with the outer casing, the elastic engaging portions can be freely deformed elastically, and rigidity thereof (elastic force) can be decreased if necessary. Accordingly, as compared with the conventional structure in which the hook is engaged and stopped only by the rigidity of the elastic engaging portions, in the present invention, the rigidity of the elastic engaging portions is set sufficiently low so as to decrease the inserting force at the time of engaging the hook, so that the workability at the time of assembling the hook can be improved.

According to a second aspect of the invention, in the article holding device as described above, the outer casing further includes a third engaging portion and concave step portions. The third engaging portion is provided on the inner wall surface of the outer casing at a position in a forward side in a direction of inserting the main body relative to the first engaging portion, and the third engaging portion engages the second engaging portion at a temporary insertion position in which the main body is not fully inserted into the outer casing to become the assembled condition. When an inserting force larger than an inserting force for engaging the hook with the protruding portions is applied to the bottom wall of the main body, the third engaging portion is disengaged from the second engaging portion. The concave step portions are provided on the inner wall surface of the outer casing corresponding to the elastic engaging portions of the main body at the temporary insertion position, and the concave step portions do not prevent an elastic deformation movement of the elastic engaging portion by engaging the hook.

In the article holding device according to the second aspect of the invention, the third engaging portion is disposed on the inner wall surface of the outer casing. The third engaging portion is disposed at the forward side of the inserting direction of the core (main body) relative to the first engaging portion. When the third engaging portion is engaged with the second engaging portion provided in the main body at the temporary inserted position that the core is not fully inserted to become the assembled condition, the core is fixed at the temporary attached condition.

When the hook is inserted into the core in this engaging condition or temporary attached condition, the elastic engaging portions where the protruding portions are pressed by the hook start to bend and deform outwardly. Here, since the concave step portions are provided on the inner wall surface of the outer casing at the positions corresponding to the elastic engaging portions, the elastic engaging portions can be bent and deformed outwardly, so that the hook can be engaged and stopped at the protruding portions of the elastic engaging portions as described above. When the hook is further pushed, that is, when the inserting force larger than the inserting force for allowing the hook to engage the protruding portions is applied, the hook abuts against the bottom wall of the main body of the core, so that the inserting force is applied to the core, resulting in releasing the engaging condition between the second engaging portion and the third engaging portion. After releasing this engaging condition, the core is further inserted into the outer casing to be located at the predetermined position, and the second engaging portion is engaged with the first engaging portion as described above, so that the hook is securely held by the article holding device.

Since the core can be temporarily attached to the outer casing as described above, the setting operation for attaching the article holding device to the member to be attached, or the operation for assembling the hook can be facilitated. Also, it is easy to handle the outer casing and the core in the temporary attached condition as compared with the case in which the outer casing and the core are respectively individually handled, and the entire device can be made compact. Therefore, a space required at the time of physical distribution or stock can be reduced.

According to a third aspect of the invention, in the article holding device as described above, the elastic engaging portion is formed of an elastic member having one end connected to the side wall of the main body along a direction of engaging the hook and the other end in a free condition, and the protruding portion is disposed at the other end of the elastic member.

In the third aspect of the invention, the elastic engaging portion constitutes the elastic member. The elastic member is in a cantilever form in which the one end is connected to the side wall of the main body of the core to be formed integrally therewith and the other end provided with the protruding portion is in the free condition, and the elastic member is disposed along the direction of engaging or attaching the hook. Therefore, the elastic member can be easily bent and deformed in response to the insertion of the hook into the core, and by this simple structure, the decrease in the force for inserting the hook can be achieved.

A fourth aspect of the invention provides an article holding device for holding an article to a member to be attached by engaging a hook provided in the article, and the article holding device is formed of an outer casing which is attached to a mounting hole provided in the member to be attached and includes a hollow inside and an inner wall surface provided with fourth engaging portions in the vicinity of an opening of the outer casing; and a core having a pair of side walls, a bottom wall, a pair of protruding portions, fifth engaging portions, and sixth engaging portions. In the core, the pair of side walls is inserted into the outer casing from the opening, and has outer surfaces abutting against the inner wall surface of the outer casing when the side walls are inserted into the outer casing so as to have a predetermined interval therebetween. The bottom wall is connected to the respective distal end portions of the side walls in an inserting direction to be integral therewith, and is elastically deformable to allow the side walls to move freely from an expanded condition to a condition having the predetermined interval between the side walls. The pair of protruding portions faces each other and is disposed on respective inner wall surfaces of the side walls. The pair of protruding portions gets closer to each other and engages the hook when the pair of the side walls is moved from the expanded condition to the condition having the predetermined interval therebetween.

The fifth engaging portions are disposed at distal end sides of the outer surfaces of the side walls, and are engaged with the fourth engaging portions in a condition that the side walls are expanded for predetermined angles. The fifth engaging portions are disengaged from the fourth engaging portions when an inserting force for inserting the side walls expanded for the predetermined angles is applied to the bottom wall. The sixth engaging portions are disposed at rear end sides of the outer wall surfaces of the side walls and engaged with the fourth engaging portions in an assembled condition that the side walls are inserted into the outer casing to have the predetermined interval therebetween.

In the article holding device according to the fourth aspect of the invention, the fourth engaging portions, which are provided on the inner wall surfaces of the outer casing in the vicinity of an inlet of the opening of the outer casing, are engaged with the fifth engaging portions provided on the distal end sides of the outer wall surfaces of the side walls forming a part of the core, to thereby temporarily attach the core to the outer casing. At this time, the pair of the side walls is expanded larger (for the predetermined angles) than the opening of the outer casing by the elastic force of the bottom wall, which is elastically deformable and connected to the respective distal end portions of the side walls, so that the interval or space is formed between the side walls to thereby enable the engagement with the hook.

When the hook is disposed between the side walls and pushed thereinto, the hook abuts against the bottom wall, and by the inserting force thereof, the fifth engaging portions are disengaged from the fourth engaging portions, so that the core (the pair of the side walls) is inserted into the outer casing. Accordingly, the interval between the pair of the side walls becomes narrow by the bending deformation of the bottom wall, and the outer wall surface of the side walls are allowed to abut against the inner wall surfaces of the outer casing to have the predetermined interval between the side walls. By this closing operation, the protruding portions facing each other and respectively disposed on the inner wall surfaces of the side walls get closer to each other, to thereby hold the hook. The core inserted into the outer casing and catching the hook at the protruding portions is assembled when the sixth engaging portions disposed at the rear end sides of the outer wall surfaces of the side walls are engaged with the fourth engaging portions of the outer casing.

Accordingly, the hook is held by the article holding device attached to the member to be attached, and also in this article holding device, since the outer casing prevents the pair of the side walls of the core from expanding, even if the extracting force is applied to the hook, the hook is not easily disengaged. Also, since the force required for attaching the hook to the core is only the inserting force for inserting the core in the temporary attached condition into the outer casing, the hook can be easily inserted into the core.

DETAILED DESCRIPTION OF PREFERRED EMBODIMENTS

Figure 1:
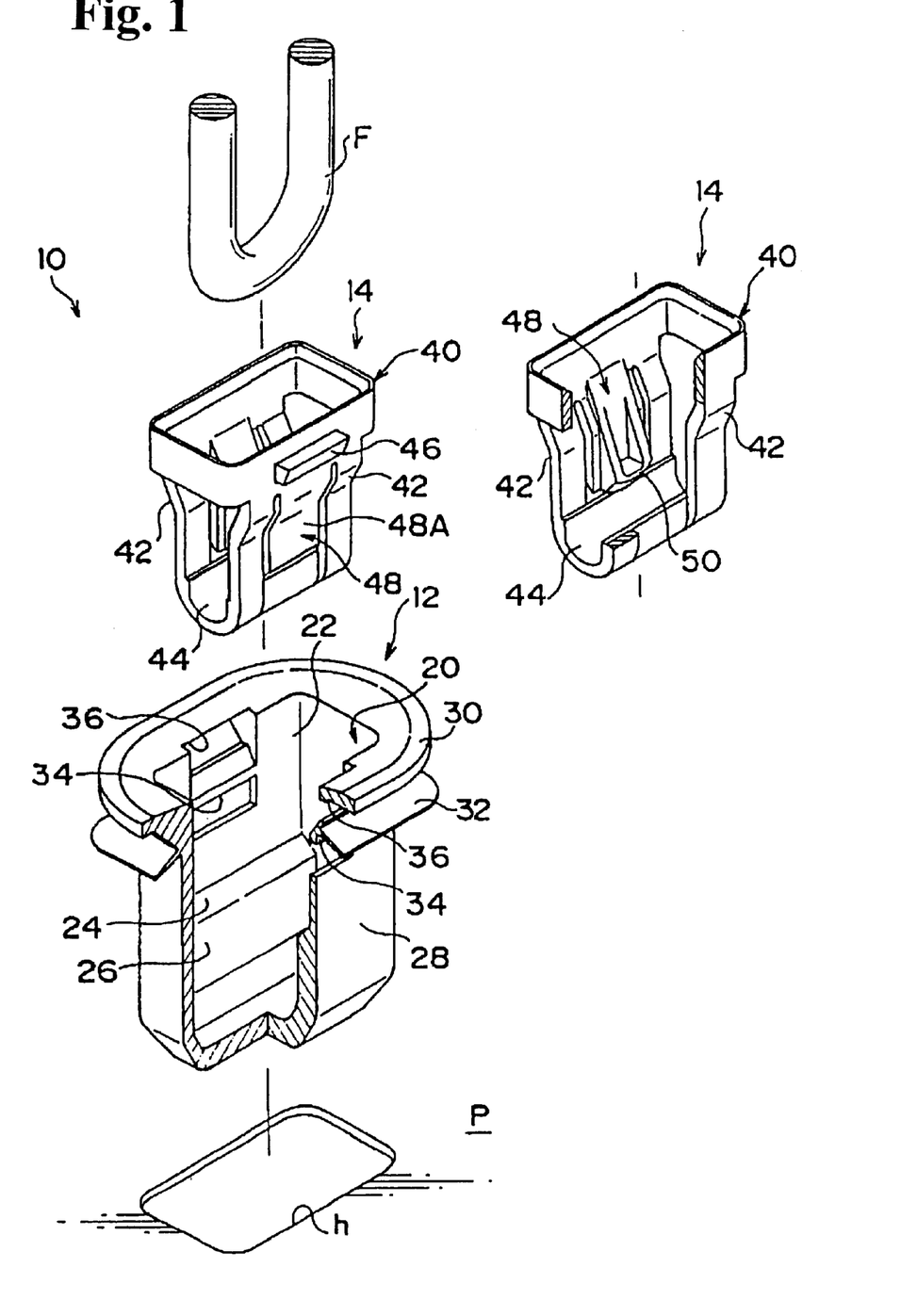
FIG. 1 is a partly cut, exploded perspective view of an article holding device according to a first embodiment of the invention.
Figure 2:
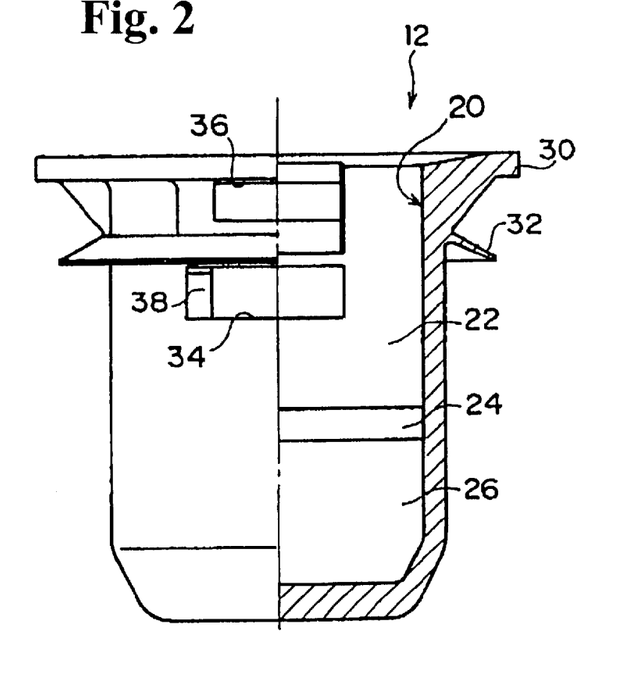
FIG. 2 is a front view of an outer casing shown in FIG. 1, in which a right half thereof is shown in section.
Figure 3:
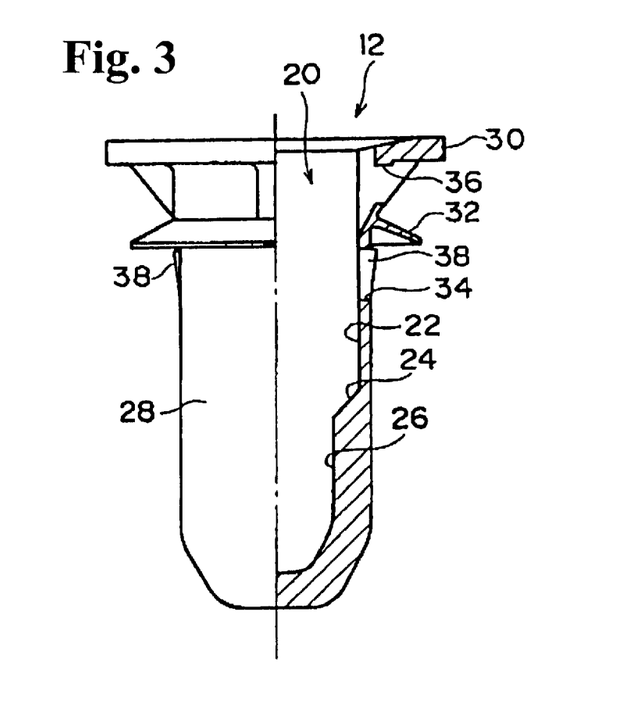
FIG. 3 is a side view of the outer casing shown in FIG. 1, in which a right half thereof is shown in section.
Figure 4:
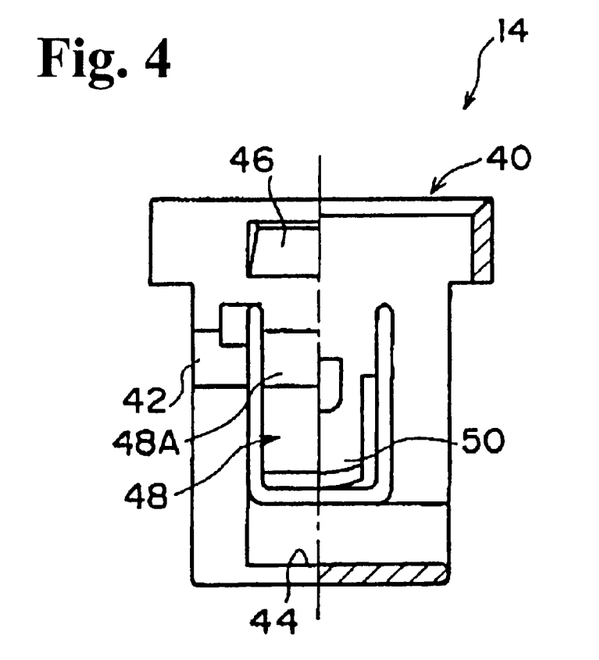
FIG. 4 is a front view of a core shown in FIG. 1, in which a right half thereof is shown in section.

Hereunder, a first embodiment of the invention will be explained with reference to the attached drawings. FIG. 1 shows an exploded perspective view of an article holding device according to the first embodiment of the invention, and respective constituent members forming the article holding device are shown in FIGS. 2 through 5. As shown in the figures, an article holding device 10 is formed of an outer casing 12 and a core 14 as in the conventional article holding device, and the outer casing 12 and the core 14 are molded by synthetic resin, such as PP (polypropylene) or POM.

In the outer casing 12, an upper surface thereof is opened and an inside thereof is hollow, and a lateral cross section of a hollow portion of the outer casing 12 has a substantially rectangular shape. In the inner wall surfaces facing each other in a short-lengthwise direction of inner wall surfaces 20 of a hollow portion, an opening side (inlet side) constitutes a wide width portion 22 having a wide space extending down to a predetermined depth, and a deeper side located after passing through the wide width portion 22 and a tapered portion 24 constitutes a narrow width portion 26 (refer to FIG. 3).

Also, in the outer casing 12, a flange 30 expanding upwardly is integrally formed at an upper rim of a side wall 28, and an engaging flange 32 expanding downwardly is integrally formed on an outer peripheral surface of the side wall 28 located slightly below the flange 30. Below the engaging flange 32, a pair of rectangular holes 34 is bored in the wide width portion 22 of the inner wall surfaces 20, and above the pair of the rectangular holes 34, a pair of rectangular holes 36 is bored on a tapered surface expanding upwardly and located between the flange 30 and the engaging flange 32. Also, engaging claws 38 are respectively provided on outer wall surfaces of both side rim portions of the rectangular holes 34.

When the outer casing 12 is inserted into a mounting hole h of a panel P, as in the conventional article holding device, the engaging flange 32 covers a front surface around a peripheral rim of the mounting hole h, and the engaging claws 38 engage the mounting hole h to be temporarily fixed.

On the other hand, the core 14 includes a main body 40 which is inserted into the hollow portion of the outer casing 12, in which an upper surface of the main body 40 and lower sides of both side surfaces facing each other in a longitudinal direction are opened such that an inside of the main body 40 is hollow. In the main body 40, in correspondence with the wide width portion 22 and the narrow width portion 26 of the outer casing 12, the width of upper portion sides of both side walls 42 facing in the short-lengthwise direction is wide, and the width of lower portion sides thereof is narrow. Furthermore, the outer width in the longitudinal direction of the main body 40 is aligned with the longitudinal inner width of the inner wall surface 20 of the outer casing 12, and in the condition of assembling the main body 40 into the outer casing 12 described later, the main body 40 of the core 14 can be inserted into the outer casing 12 with almost no play.

Also, a lower end portion of the side wall 42 constitutes a bottom wall 44 which has a section in a circular arc shape (refer to FIG. 5) along a sectional shape of a distal end portion of the hook F to be inserted, and a pair of projecting portions 46 engaging the rectangular holes 34 and 36 of the outer casing 12 is formed integrally at an upper portion of the outer wall surface of the side wall 42. In the projecting portions 46, projecting surfaces thereof constitute tapered surfaces inclined donwardly, and in the engagement with the rectangular holes 34 or the rectangular holes 36, an extracting force is set larger than the inserting force.

Further, in the side wall 42, a pair of elastic engaging portions 48 facing each other is integrally disposed at a position below the projecting portions 46. The elastic engaging portion 48 has an upper end connected to the side wall 42 and a lower end in a free condition. Namely, the elastic engaging portion 48 is an elastic member in a cantilever form disposed along a direction of engaging or attaching the hook F, and a lower end side of the elastic engaging portion 48 can be easily displaced relative to an outer side of the main body 40 (the core 14) or an inner side thereof. Also, an outer wall surface 48A has a shape along the outer wall surface of the side wall 42.

Figure 5:
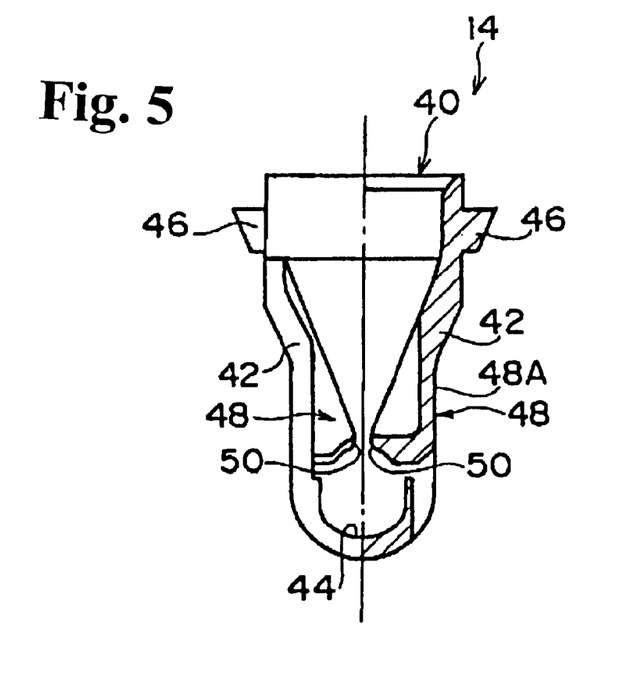
FIG. 5 is a side view of the core in FIG. 1, in which a right half thereof is shown in section.

On the inner wall surfaces of both elastic engaging portions 48, there are disposed protruding portions 50 facing each other, which include tapered surfaces inclined gradually toward a lower side and project toward an inner side than the inner wall surface of the side wall 42. An interval or space in a narrowest portion between the protruding portions 50 is set to be narrower than the width of the hook F in the condition that no load is applied to the elastic engaging portions 48 as shown in FIG. 5.

Figure 6:
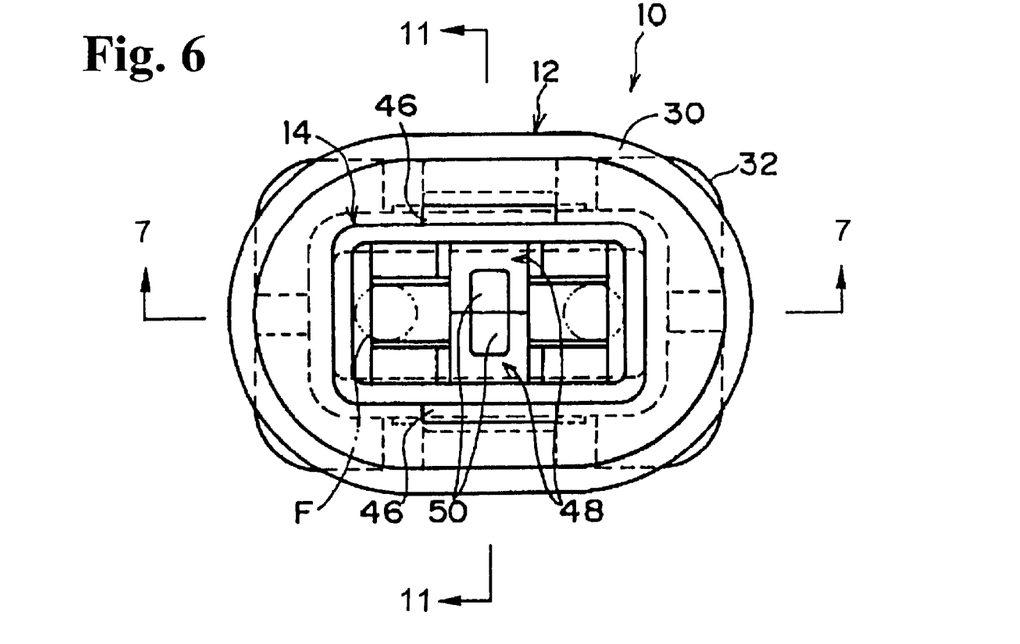
FIG. 6 is a plan view showing a condition that a hook is assembled with the article holding device in FIG. 1.
Figure 7:
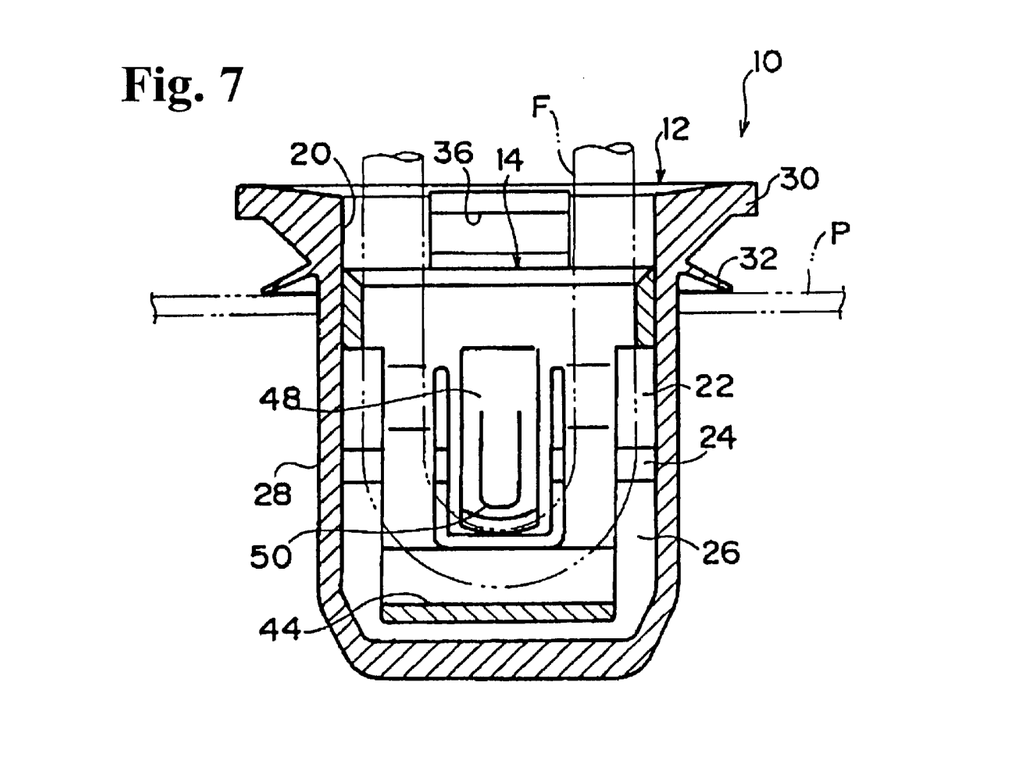
FIG. 7 is a sectional view taken along line 7—7 in FIG. 6.

Next, operations of the embodiment will be explained. FIG. 6 and FIG. 7 show a condition that the hook F is held by the article holding device 10 attached to the panel P, and FIGS. 8 through 11 show steps of assembling the same.

Figure 8:
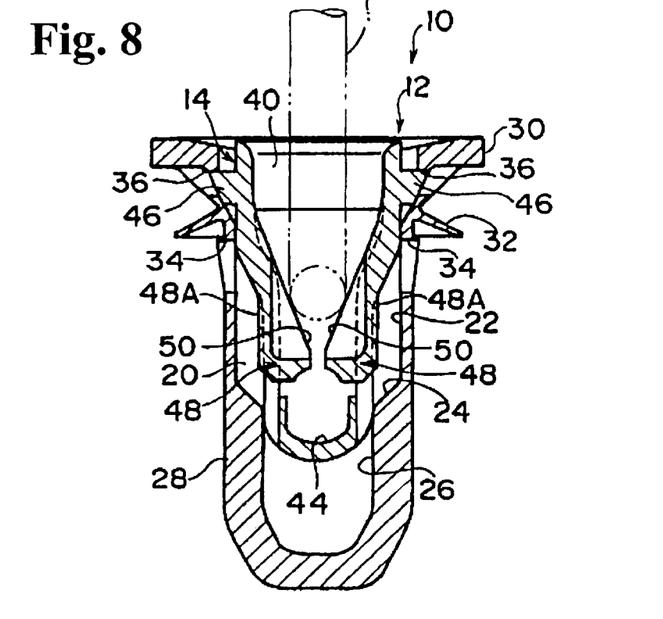
FIG. 8 is a side sectional view for explaining an operation of assembling the hook into the article holding device.

Firstly, the outer casing 12 and the core 14 forming the article holding device 10 are temporarily attached. In the embodiment, when the core 14 is inserted into the outer casing 12 in a direction shown in FIG. 1, the projecting portions 46 of the core 14 are engaged with the rectangular holes 36 of the outer casing 12 disposed in a forward side of the inserting direction such that the core 14 is fixed to the outer casing 12 in a temporary attached condition as shown in FIG. 8. In this temporary attached condition, the elastic engaging portions 48 are located at the wide width portion 22 of the outer casing 12, and the elastic engaging portions 48 can be elastically deformed outwardly within a predetermined range. In this condition, when the article holding device 10 is inserted into the mounting hole h of the panel P, as described above, the engaging claws 38 are engaged with the mounting hole h by the elastic force of the side wall 28 of the outer casing 12, and the article holding device 10 is set at the mounting hole h.

Figure 9:
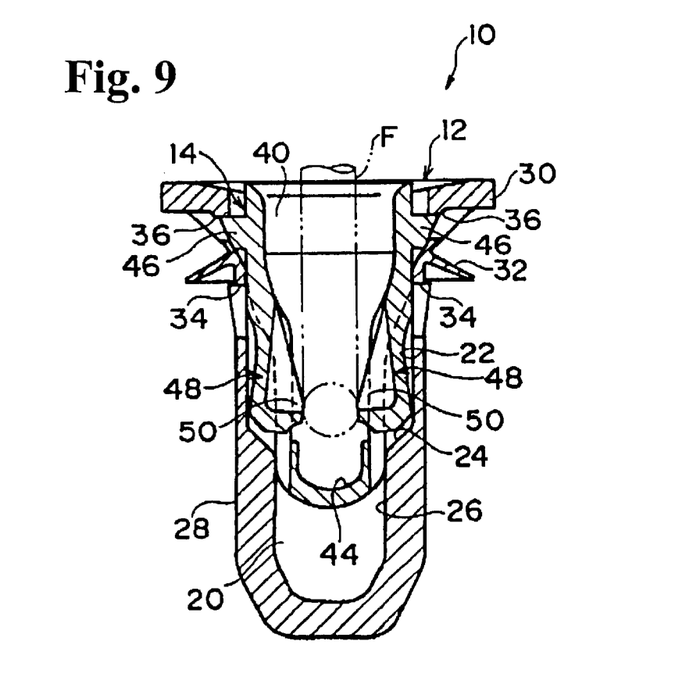
FIG. 9 is a side sectional view for explaining an operation of assembling the hook into the article holding device.
Figure 10:
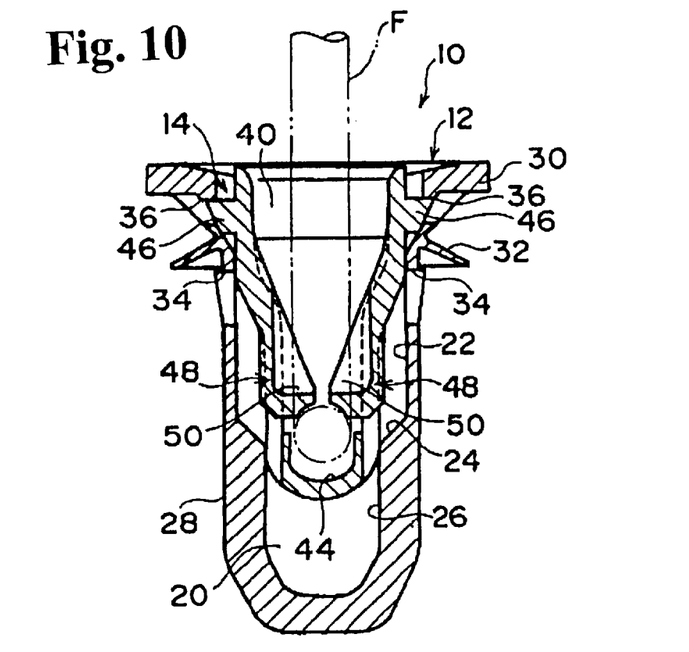
FIG. 10 is a side sectional view for explaining an operation of assembling the hook into the article holding device.

Next, when the hook F is inserted into the core 14 of the article holding device 10 in the direction shown in FIG. 1, the protruding portions 50 pressed by the distal end portion of the hook F allow the elastic engaging portions 48 to be bent and deformed outwardly as shown in FIG. 9. When the hook F is further pushed to pass through the protruding portions 50 as they are, the protruding portions 50 are returned inwardly by the elastic force of the elastic engaging portions 48 to engage the hook F thereat as shown in FIG. 10.

Figure 11:
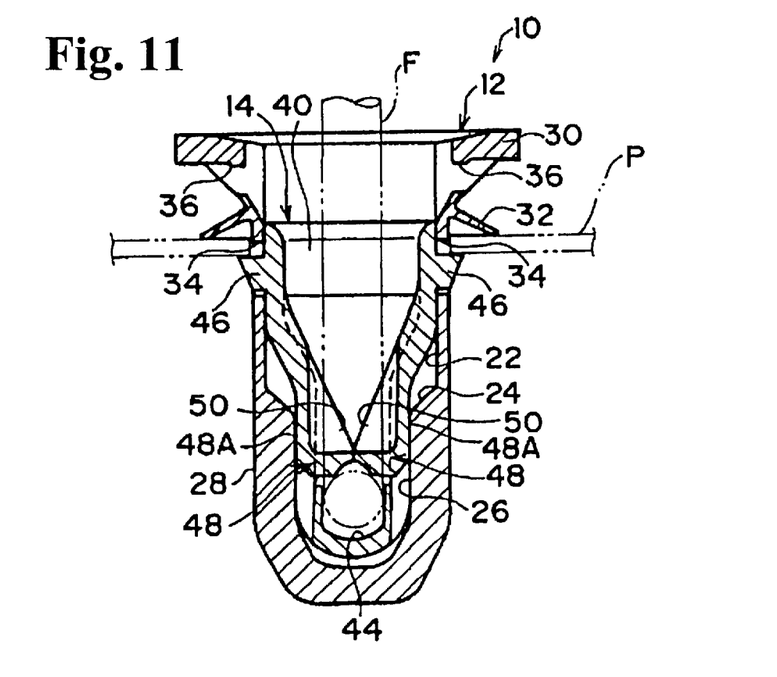
FIG. 11 is a sectional view taken along line 11—11 in FIG. 6.

When the hook F is further pushed into the core 14, the hook F abuts against the bottom wall 44 of the core 14, and the inserting force reaches the core 14. Accordingly, the projecting portions 46 are disengaged from the rectangular holes 36, and the core 14 is inserted into the outer casing 12. When the core 14 is inserted to a predetermined position in the outer casing 12, as shown in FIG. 11, the projecting portions 46 pass through the mounting hole h of the panel P to engage the mounting hole h, and both the core 14 and the outer casing 12 are strongly fixed to the panel P.

In this assembled condition, the outer wall surfaces 48A of the elastic engaging portions 48 abut against the narrow width portion 26 of the inner wall surface 20 of the outer casing 12, so that the protruding portions 50 can not be displaced or moved outwardly. Therefore, the hook F is strongly fixed since the protruding portions 50 can not be expanded, and it becomes difficult to disengage the hook F from the article holding device 10.

As described above, according to the article holding device of the aforementioned embodiment, in the temporary attached condition, the elastic engaging portions 48 of the core 14 are located at the wide width portion 22 of the outer casing 12, so that the hook F is engaged with the protruding portions 50 by elastic deformation of the elastic engaging portions 48 outwardly and inwardly (returning). In the assembled condition, the elastic engaging portions 48 reinforced by the outer casing 12 securely hold the hook F by the protruding portions 50. Therefore, even if the rigidity of the elastic engaging portion 48 is set low, the force for holding the hook F is not decreased, so that the workability at the time of assembling the hook F can be improved.

Also, in the aforementioned embodiment, since the projecting portions 46 are engaged and fixed at the rectangular holes 36 at a temporary inserting position in which the core 14 is not fully inserted into the outer casing 12 for the assembled condition, the operation of setting the article holding device 10 or the operation of assembling the hook F can be facilitated. Also, the outer casing 12 and the core 14 in the embodiment can be handled easily as compared to the case that each of the outer casing 12 and the core 14 is individually handled, so that the entire article holding device can be made compact, resulting in reducing an inventory space or the like.

Furthermore, in the aforementioned embodiment, the elastic engaging portions 48 constitute the elastic members in the cantilever form disposed along the direction of engaging or attaching the hook F such that the elastic engaging portions 48 can be easily bent and deformed in response to the engagement of the hook F. Thus, the force for inserting the hook F can be sufficiently decreased.

Incidentally, in the article holding device of the embodiment, in order to strongly attach the core 14, to which the force for extracting the hook F is directly applied, to the panel P, the protruding portions 50 of the core 14 in the assembled condition are engaged with and fixed to the mounting hole h of the panel P. However, this attaching structure can be achieved by utilizing engaging claws provided in the outer wall surface of the outer casing as in the conventional article holding device. In this case, in the assembled condition, the protruding portions 50 are engaged with the rectangular holes 34 of the outer casing 12 to be fixed thereat.

Also, even in an embodiment which is not provided with a structure for temporarily fixing the core to the outer casing, the present invention can be applied thereto by that the core is engaged or attached to the hook in advance and then inserted into the outer casing. Also, the elastic engaging portions 48 provided with the protruding portions 50 for engaging the hook F, the projecting portions 46 and the rectangular holes 34 and 36 for holding the core 14 to the outer casing 12 in the temporary attached condition and in the assembled condition can be formed at only one side. Furthermore, in the elastic engaging portions 48, the lower end thereof can be connected to the side wall 42, and the upper end side thereof can be displaced or moved.

Next, a second embodiment of the invention will be explained. In the second embodiment, the same constituents as those explained in the first embodiment and constituents having the same functions as those in the first embodiment are designated by the same references, and explanations thereof are omitted herewith.

Figure 12:
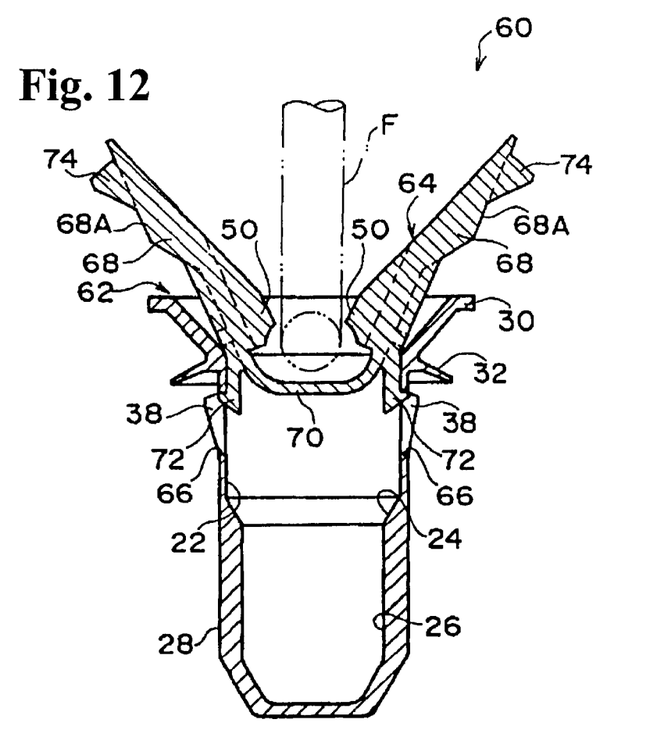
FIG. 12 is a side sectional view of an article holding device according to a second embodiment of the invention, in which the article holding device is in a temporary attached condition.
Figure 13:
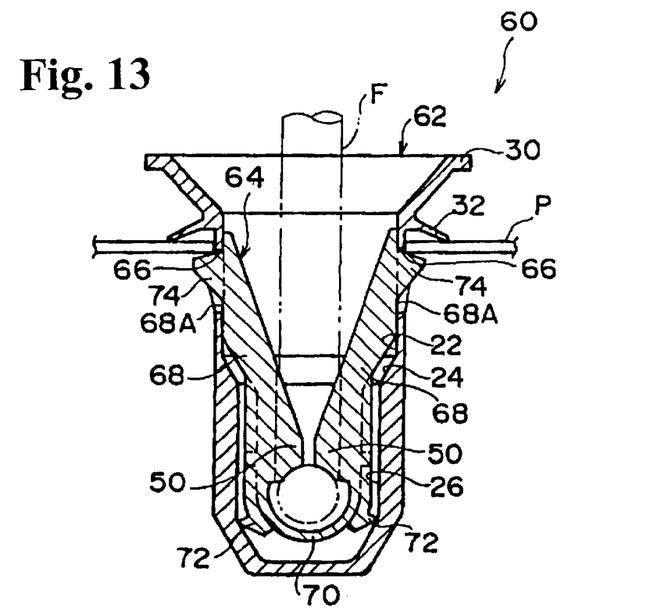
FIG. 13 is a side sectional view showing an assembled condition of the article holding device shown in FIG. 12.

FIG. 12 and FIG. 13 show side sectional views of an article holding device 60 according to the second embodiment of the invention. In an outer casing 62 of the article holding device 60, a pair of rectangular holes 66 as engaging portions for temporarily attaching a core 64 and assembling the same at a predetermined position is disposed below the engaging flange 32, that is, in the vicinity of an inlet of an opening section.

On the other hand, as shown in the figures, the core 64 includes a pair of side walls 68, and a bottom wall 70, which connects distal end portions of the side walls 68 in the inserting direction to be integral with the side walls 68 and elastically deformable. In the temporary attached condition shown in FIG. 12, both side walls 68 are expanded by the elastic force of the bottom wall 70 to be larger than the opening section of the outer casing 62, so that a space is formed between the side walls 68. On the respective inner wall surfaces of the side walls 68, a pair of protruding portions 50 is disposed to face each other, and when the side walls 68 are moved from the expanded condition toward the closing direction by the bending deformation of the bottom wall 70, the protruding portions 50 get closer to each other to engage the hook F.

Also, the distal end sides of the outer wall surfaces of the side walls 68 are provided with a pair of engaging claws 72, and in the temporary attached condition in FIG. 12 in which the engaging claws 72 are engaged with the rectangular holes 66 of the outer casing 12, the side walls 68 are expanded for predetermined angles. Furthermore, rear end sides of the outer wall surfaces of the side walls 68 are provided with a pair of engaging projections 74.

Therefore, in order to hold the hook F by the article holding device 60, the hook F is placed between the side walls 68 of the core 64 in the temporary attached condition, and pushed thereinto. Accordingly, the hook F abuts against the bottom wall 70 of the core 64, and the engaging claws 72 are disengaged from the rectangular holes 66 of the outer casing 62 by the inserting force, so that the core 64 is inserted into the outer casing 62. In accordance therewith, while the side walls 68 are regulated by the opening section of the outer casing 62, the space between the side walls 68 is narrowed by the bending deformation of the bottom wall 70, and when the side walls 68 are inserted into the predetermined position, the respective outer wall surfaces 68A abut against the wide width portion 22 of the outer casing 62, so that the side walls 68 are disposed to have a predetermined interval therebetween. By this closing operation, the hook F is engaged with and fixed by the protruding portions 50, and at the same time, the engaging projections 74 of the core 14 are engaged with rectangular holes 66 of the outer casing 62 and the mounting hole h of the panel P, resulting in the attached condition shown in FIG. 13.

As described above, in the article holding device 60 of the second embodiment of the invention, in the condition that the side walls 68 of the core 64 substantially retain the hook F, the side walls 68 abut against the outer casing 62 and become unable to expand, to thereby hold the hook F. Also, the force for inserting the hook for this assembling is formed of only the inserting force for inserting the core 64 temporarily attached by engaging the engaging claws 72 with the rectangular holes 66 into the outer casing 62, and an inserting force for engaging the engaging projections 74 with the rectangular holes 66. Thus, the hook inserting force here is also extremely reduced as compared with that of the conventional device, so that the assembling operation can be facilitated.

Incidentally, also in the second embodiment, the protruding portions 50 of the side walls 68 for attaching the hook F, and the engaging claws 72, the engaging projections 74 and the rectangular holes 66 can be disposed at only one side.

Furthermore, the present invention is not limited to the article holding device which holds the hook in the seat to the panel as explained in the first and second embodiments, and the present invention can be applied to devices for holding other articles.

Since the article holding device of the invention has the aforementioned structures, without decreasing the force for holding the hook in the engagement of the hook provided in the article, only the inserting force is decreased, so that the workability in assembling the hook can be improved.

While the invention has been explained with reference to the specific embodiments of the invention, the explanation is illustrative and the invention is limited only by the appended claims.

What is claimed is:

1. An article holding device for holding an article with a hook to a member, comprising:

an outer casing adapted to be attached to a mounting hole of the member to be attached, and including a hollow inside and a first engaging portion at an inner wall surface, and a core including a main body to be inserted into the outer casing and having a hollow inside for receiving the hook, an inner wall surface, and an outer wall surface; a second engaging portion provided on the outer wall surface of the main body and engaging the first engaging portion in an assembled condition that the main body is inserted to a predetermined position of the outer casing; and a protruding portion formed at a side wall of the main body and protruding toward an inner side than the inner wall surface of the main body to be able to engage the hook inserted into the core, said protruding portion having a rear surface abutting against the inner wall surface of the outer casing in the assembled condition.

2. An article holding device according to claim 1, further comprising a third engaging portion formed at one of the outer casing and the core for allowing the core to be held at a temporary insertion position in which the main body is not fully inserted into the outer casing before the assembled condition.

3. An article holding device according to claim 2, wherein said third engaging portion is formed at the inner wall surface of the outer casing at a forward side in a direction of inserting the main body relative to the first engaging portion, said third engaging portion engaging the second engaging portion at the temporary insertion position, and disengaging the second engaging portion when an inserting force larger than an inserting force for engaging the hook with the protruding portion is applied to the bottom wall of the main body to thereby move and engage the second engaging portion in the assembled condition.

4. An article holding device according to claim 3, wherein said core has a rectangular shape, and said protruding portion is elastically deformable and formed integrally with the side wall of the core.

5. An article holding device according to claim 4, wherein said outer casing further includes a concave portion provided on the inner wall surface of the outer casing at a position where the protruding portion of the main body is in the temporary insertion position, said concave portion allowing an elastic deformation of the protruding portion in engaging the hook.

6. An article holding device according to claim 5, wherein said protruding portion includes an elastic member having one end connected to the side wall of the main body along a direction of engaging the hook and the other end in a free condition, said protruding portion being formed at the other end of the elastic member.

7. An article holding device according to claim 2, wherein said core is formed of a pair of side walls, and a bottom wall connected to the side walls for allowing the side walls to be elastically deformable and to move from an expanded condition to a condition having the predetermined interval between the side walls.

8. An article holding device according to claim 7, wherein said third engaging portion is formed at at least one side of the side wall near the bottom wall to engage the first engaging portion in the temporary insertion position, said second engaging portion is formed at at least one side of the side wall at an end away from the bottom wall to engage the first engaging position when the core is inserted into the casing.

9. An article holding device according to claim 8, wherein said protruding portion is formed in each inner surface of the side wall for allowing the hook to pass between the protruding portions in the temporary insertion position and preventing the hook to pass between the protruding portions when the side walls are located close to each other.

10. An article holding device according to claim 1, wherein said rear surface of the protruding portion directly abuts against the inner wall surface of the outer casing in the assembled condition so that the protruding portion does not substantially move rearwardly in the assembled condition to prevent the hook from disengaging from the main body.

* * * * *